United States Patent [19]

Sydnor

[11] Patent Number: 4,517,530
[45] Date of Patent: May 14, 1985

[54] MASER CAVITY SERVO-TUNING SYSTEM
[75] Inventor: Richard L. Sydnor, Altadena, Calif.
[73] Assignee: The United States of America as represented by the Administrator of the National Aeronautics and Space Administration, Washington, DC
[21] Appl. No.: 556,513
[22] Filed: Nov. 30, 1983
[51] Int. Cl.³ .......................... H03L 7/26; H01P 7/06
[52] U.S. Cl. ........................................ 331/3; 331/31; 331/36 C; 331/96; 331/94.1; 333/231
[58] Field of Search ............... 331/3, 94.1, 30, 31, 331/36 C, 96, 177 V; 333/231, 17 R

[56] References Cited
U.S. PATENT DOCUMENTS

| 3,392,353 | 7/1968 | Miller | 332/7.51 |
| 3,938,058 | 2/1976 | Yamamoto | 372/20 |
| 3,991,383 | 11/1976 | Hughes | 372/20 |
| 4,122,408 | 10/1978 | Walls | 331/3 |
| 4,122,412 | 10/1978 | Hughes | 372/20 |
| 4,314,209 | 2/1982 | Wang | 331/3 |
| 4,326,174 | 4/1982 | Busca et al. | 331/3 |
| 4,449,105 | 5/1984 | Frank et al. | 331/3 |

Primary Examiner—Siegfried H. Grimm
Attorney, Agent, or Firm—Paul F. McCaul; John R. Manning; Thomas H. Jones

[57] ABSTRACT

Two collocated, weakly coupled probes, on loop and one dipole, detect the magnetic and electric fields inside a maser cavity. Signals from the probes are compared in phase, and the signal output from the phase detector is applied to a varactor, the reactance of which is coupled into the cavity by a microwave coupler. Alternatively, the varactor may be placed inside the cavity. Any deviation of phase from 90° as detected by the phase detector will then produce an error signal that will change the reactance coupled into the resonant cavity to change its reactance, and thus correct its resonance frequency. An alternative to using two probes is to use a single disk probe oriented to detect both the magnetic and electric fields, and thus provide the error signal directly.

11 Claims, 3 Drawing Figures

MASER CAVITY SERVO-TUNING SYSTEM

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

This invention relates to devices having a resonant cavity, and more particularly to a servo system for stabilizing the cavity resonance.

Any finite Q cavity relied upon to have a constant resonance requires a servo-tuning system to compensate for cavity pulling effect, i.e., to compensate for the undesired change from a specified frequency, due to any change in the dimensions of the cavity, particularly a high Q cavity and other effects contributing to long term frequency drift. While reference is made to masers, an acronym for microwave amplification by stimulated emission of radiation, it is in the generic sense that it is used here to refer to any finite Q cavity, even though the specific example described is a maser in the more limited sense.

The acronym laser for light amplification by stimulated emission of radiation has been commonly used to refer to masers that operate at frequencies in the optical region of the electromagnetic spectrum, rather than in the longer wavelength (microwave) region. However, it will be appreciated from the following description of the invention that in theory the present invention is not restricted to the microwave region, although in practice it may be difficult to implement the invention with a shorter wavelength. Consequently, as noted above, the term maser refers to any resonant cavity, including resonant cavities used for such applications or in such devices as klystrons and tuned microwave filters. The practical limits of radiation wavelength will be appreciated, and as technology improves for sensing the phase relationship between the electric and magnetic fields of the radiation inside the cavity, the limit may be extended well into the shorter wavelength of visible light.

The problem with masers has been cavity tuning. Prior-art schemes for servo tuning can adversely affect the performance of the maser. They require either signal injection into the cavity, modulation of the cavity frequency, or modulation of the atomic line Q in order to provide an effect that can be sensed to determine when the cavity frequency has shifted in order to tune the cavity. This injection of a "tracer" of some form capable of being sensed can only have an adverse effect. It would be preferable to use a passive system to sense drift in the cavity frequency, i.e., to sense drift without injection of any tracer, in order to adjust the cavity tuning through a servo, thereby obviating any risk of an adverse effect on the performance of the maser.

SUMMARY OF THE INVENTION

In accordance with the present invention, the phase relationship between the electric and magnetic fields of the finite Q cavity is sensed. The phase angle is normally 90° for the proper resonance condition. Any variation in the phase angle from this normal condition is detected and used to drive a cavity tuning servo. In one implementation of this invention, the phase angle may be detected by two probes which are collocated in the cavity, one a loop to detect the magnetic field and the other a dipole to detect the electric field. A disk of dielectric material may be used to support a thin film of conductive material on its edge of the loop, and to support on one face a thin-film dipole. In that manner the probes can be made sufficiently small to have minimal effect on the maser resonance frequency. An error signal proportional to the detected difference in the phases of the probe signals produced from the E and H fields is used to drive a varactor. The reactance of the varactor is then coupled into the cavity to tune the cavity resonance.

The novel features of the invention are set forth with particularity in the appended claims. The invention will best be understood from the following description when read in connection with the accompanying drawings.

DESCRIPTION OF PREFERRED EMBODIMENTS

Introduction

Figure 1:
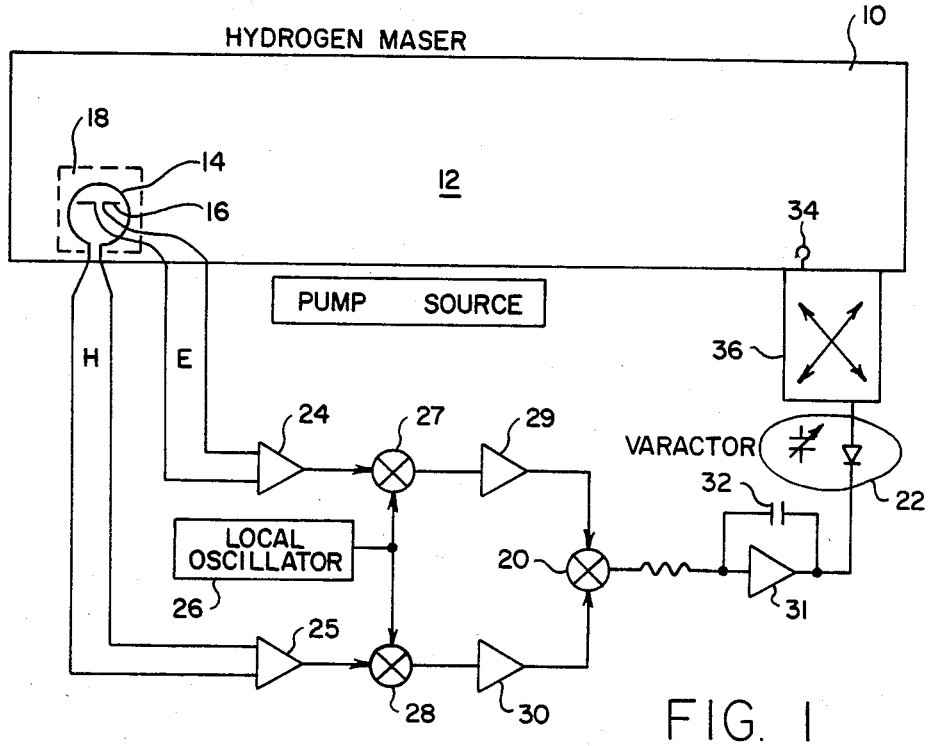
FIG. 1 is a schematic diagram of one example of the invention including magnetic and electric field probes within a maser cavity and a servo loop from the probes to a varactor the reactance of which is coupled into the cavity by a microwave coupler.

Referring to FIG. 1 of the drawings, the dominant cause of the long term frequency drift in a hydrogen maser 10 is the slow change in the dimensions of the high Q cavity. Since the dimensions of the cavity must be held stable to approximately one angstrom to maintain the frequency of the maser to one part in $10^{15}$, it is difficult to directly measure and control. This dimensional change must be overcome in some indirect manner which senses the cavity frequency drift and tunes the cavity back to resonance. Aside from overcoming the cavity pulling effect, servo tuning can also enhance the performance of the maser by reducing the sensitivity to pressure variations, and compensating for anomalous frequency shifts often encountered in the hydrogen maser.

A number of techniques have been previously proposed for cavity servo-tuning. These techniques are essentially based on either the modulation of the atomic line width, or the sensing of the cavity resonance. The technique of the present invention is based on the latter effect, and utilizes the phase relationship between the electric and the magnetic fields in a finite Q cavity.

In order to better appreciate the present invention, brief discussions of servo tuning a cavity based on atomic line width modulation and on resonance sensing will first be presented. The principles on which the invention is based, namely generating an error signal from E and H field phase detection, will then be presented. Following that a description of the preferred implementation of the invention shown schematically in FIG. 3 will be disclosed.

Cavity Servo-Tuning Techniques Based on Line Width Modulation

The line width modulation technique is based on the influences of the quality factor, Q, on the atomic line, the Q of the maser cavity, and the mistuning of the cavity on the output frequency, $f_o$ of the maser. Designating the deviation of the oscillator frequency from true resonance by $\Delta f_o$, the cavity frequency mistuning by $\Delta f_c$, and the cavity and line quality factors by $Q_c$ and $Q_l$, respectively, the deviation is defined by the following equation:

$$\Delta f_o = (Q_c/Q_l) \Delta f_c. \quad (1)$$

According to equation (1), the mistuning of the cavity may be determined by changing the atomic line width. There are several ways in which this may be accomplished. In the first, and most common way, it is accomplished through the controlled modulation of the atomic beam flux, which in turn influences the contribution of the spin exchange effect to the line width. See D. Kleppner, H. M. Goldenberg, and N. F. Ramsey, Phys. Rev. 126, 603 (1962).

The modulation of the atomic flux may be accomplished in a number of ways, including the modulation of the input power of the hydrogen gas dissociator. The most popular method for atomic beam flux modulation however involves the chopping of the beam and thus controlling the number of atoms which enter the maser storage bulb in the cavity. The resulting change in the maser output frequency is detected and used to determine the cavity mistuning and thus to control the effect of the cavity drift. While this method has the advantage of simplicity and effectiveness, it nevertheless suffers from a number of problems including reproducible control of the beam chopper and adverse influence on the performance of the maser due to periodic alteration of the signal-to-noise ratio in the maser and the effect of the varying output power on the phase transfer function of the electronics.

Another technique for varying the width of the atomic line that has been attempted is the introduction of inhomogeneities in the magnetic field in the maser cavity. The resulting frequency change in the maser output frequency would be detected and used as above. This technique has not been used because of the difficulty in achieving the proper kind of controlled inhomogeneity.

Cavity Resonance Sensing Technique

A number of techniques have been devised, in connection with the development of the passive hydrogen maser to servo tune the cavity by sensing the cavity resonance. One such technique involves the injection of a signal which has been square-wave frequency modulated by an amount approximately equal to the bandwidth of the cavity, and is centered on the atomic line. If the cavity is not tuned correctly, the two signals will be attenuated by different amounts as they traverse the cavity. This modulation of the amplitude of the injected signals is then used to generate an error signal which corresponds to the difference between the cavity resonance frequency, and the frequency of the injected reference signal. See C. Audoin, Revue Phys. Appl. 16, 125 (1981).

A somewhat similar technique employs a signal centered on the atomic line which has been modulated by a sinusoidal wave to produce two side bands approximately one cavity bandwidth apart, with a carrier suppressed far enough to not perturb the maser operation. The modulation of the amplitude is again used to generate an error signal which is used to tune the cavity to resonance. See H. T. M. Wang, Proc. 34th An. Symp. on Freq. Control, (Philadelphia, PA, 1980) p. 364. Finally, in yet another technique, the cavity center frequency is square wave modulated about the hydrogen line frequency. The modulation of the amplitude is again used to measure the frequency offset. See H. E. Peters, Proc. 36th An. Symp. on Freq. Control, (Philadelphia, PA 1982) p. 240.

While all three techniques mentioned above are effective in cavity servo tuning, they nevertheless involve either the introduction of a signal in the cavity, or modulation of the cavity frequency. In either case, it is difficult to prevent the introduction of noise in the cavity and modification of the maser performance. Furthermore, these techniques are difficult to implement, and require the use of low noise and high performance electronic components which are difficult to develop.

Cavity Resonance Sensing by Phase Comparison

Figure 2:
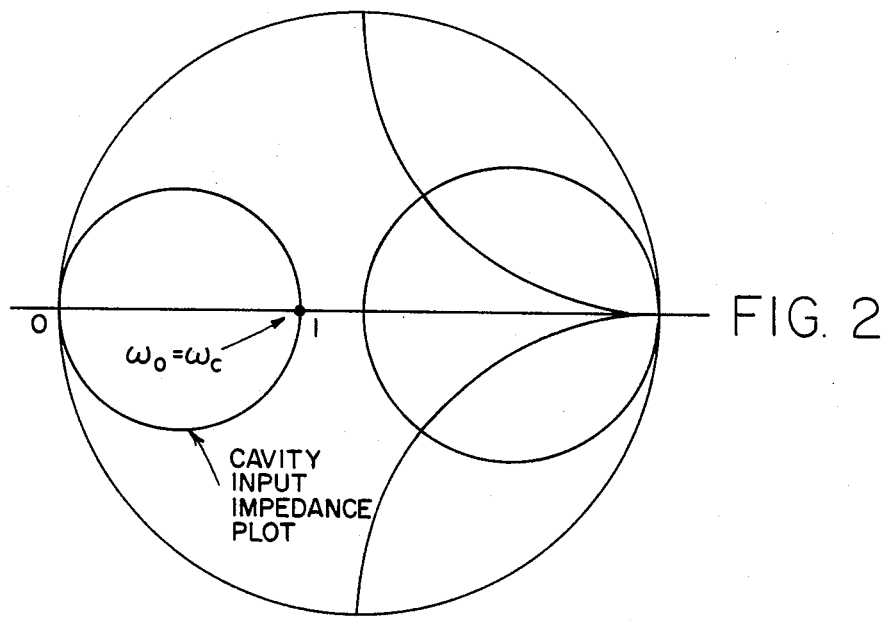
FIG. 2 illustrates normalized maser cavity input impedance versus frequency on a Smith chart.

In a resonant cavity the energy is stored in both the electric and magnetic fields. For a cavity of infinite Q, the E and H fields are in temporal and spatial quadrature. For a lossy cavity the temporal phase becomes an arccotangent function of the fractional frequency offset of the signal frequency from the cavity center frequency, normalized to the cavity bandwidth. This fact is illustrated by the input impedance of the cavity shown in the Smith chart of FIG. 2. The cavity input impedance is small far from resonance, and complex near resonance. At resonance, the input impedance is real. This, too, implies that the phase of the electric and the magnetic fields may be used to determine the cavity resonance.

The development of a cavity servo-tuning system based on the principles outlined above can be illustrated by the following, not necessarily optimum, technique. Two weakly coupled probes are collocated inside the cavity 12, one loop 14 and one dipole 16, supported by some dielectric material schematically illustrated by a dotted line box 18. The two probes are supported on an end plate of the cavity at a position away from the end plate approximately one tenth the length of the cavity. The loop is positioned perpendicular to a radial line, and the dipole is positioned within the loop on the same plane as the loop. The objective is to so position the probes that they couple some E and H energy out, but not so much as to effect the Q of the cavity, and to so orient the probes that the E and H signals are equal for the desired resonance condition of the cavity. In that manner, two separate but collocated probes can be used to detect the magnetic and the electric fields in the cavity. Signals from the two probes are compared in phase in a manner similar to that illustrated in FIG. 1. A deviation of phase from 90° as detected by a phase detector 20 will then signal the departure of the cavity from its resonance condition. The signal from the phase detector 20 may be used in conjunction with a varactor 22, the reactance of which is coupled into the cavity, to tune the cavity back to resonance.

The sensitivity of this technique in tuning the cavity may be illustrated by a simple calculation. Assuming typical values of 35000 for the Q of the maser cavity, and $10^9$ for the hydrogen line Q, and designating BW for the cavity bandwidth, BW=40571 Hz with these parameters. The cavity bandwidth corresponds to a phase shift of 90°. Assuming a sensitivity of $1 \times 10^{-6}$ radian for the phase detector, the technique will be sensitive to a fractional frequency deviation of $4.6 \times 10^{-16}$.

The implementation of the phase sensing of the cavity resonance requires careful design of the probes and their location, as well as low noise amplifiers 24, 25 for the detection of the E and H signals. An alternative to using two probes and detecting the difference in the E and H signals, a single conductive disk may be used as a probe for both the E and the H field by orienting it properly at some acute angle with respect to the radial instead of 90°, the exact angle being determined empirically for the particular shape of the disk (circular, elliptical or even rectangular) to produce desired coupling of E and H energy into the disk. A single probe would thus produce a signal on a single coaxial lead that is the vector sum of the E and H. fields. That vector sum will have a predetermined value for the resonant condition, and deviation from that as a reference is then an error signal for the servo-tuning system. In either case of one or two probes, this method, unlike the other cavity sensing techniques mentioned above, dispenses with the need of injecting signals in the cavity, and therefore does not adversely affect maser performance.

Implementation

Figure 3:
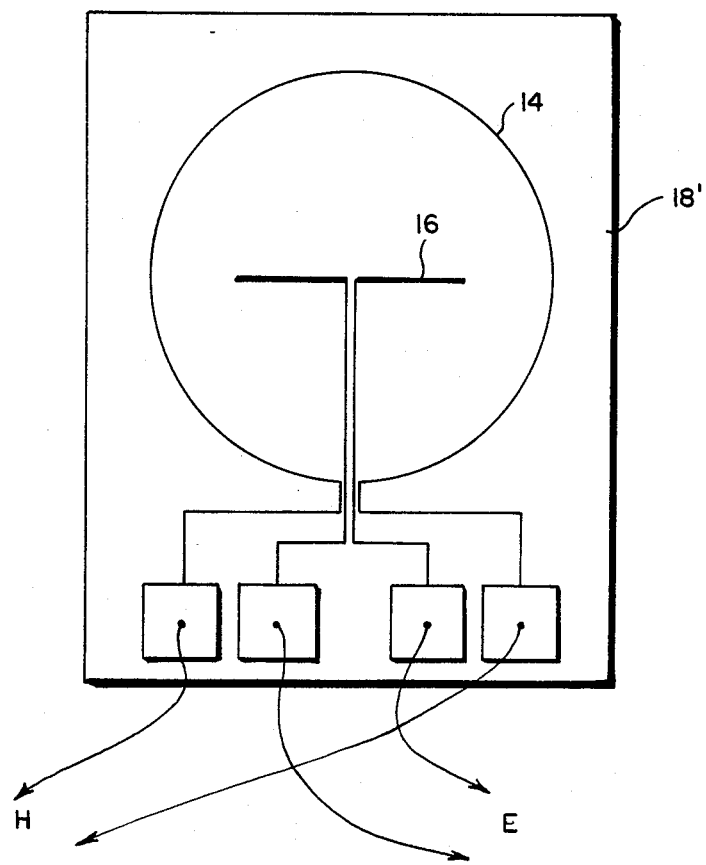
FIG. 3 illustrates a preferred implementation of collocated loop and dipole probes for placement in the maser cavity.

FIG. 3 illustrates a preferred implementation of the one example that uses two probes supported on a ceramic chip 18'. The loop 14 for the H field and the dipole 16 are provided by depositing a thin conductive film in the pattern shown. Vapor deposition and photoresist etching techniques may be used for fabricating these probes of the very small dimensions required. Coaxial leads connect the probes to the low-noise amplifiers 24 and 25.

The outputs of these amplifiers are compared in phase by first combining these output signals with a signal from a local oscillator 26 in double balanced (diode ring) mixers 27 and 28, and then after amplification of the difference frequencies out of the two mixers by buffer amplifiers 29 and 30, phase detected by another double balanced mixer used as a phase detector. The Hewlett-Packard double balanced mixer model 10514A, a broadband device (200 kHz to 500 MHz) which uses four hot carrier diodes in a ring, is one example of a commercially available mixer suitable for the present invention. It is capable of efficient operation as a low-noise phase detector.

The difference between the inputs to the phase detector 20 at the same frequency is a dc signal proportional to the difference in their phase. An operational amplifier 31 with a feedback capacitor 32 is provided as a low-pass amplifier coupling the phase error signal to the varactor. The change in reactance which occurs in the varactor, i.e., the voltage-variable capacitance in a pn junction of a solid-state diode, is coupled into a loop 34 inside the cavity by a microwave coupler 36 shown as a 3-dB directional coupler, a quadrature hybrid junction that divides the input power at one port equally between two other ports, and no power to the remaining port. Alternatively, the microwave coupler may be a T junction used as a simple coupler by means of a small circular hole as the junction. The hole acts as an antenna aperture which couples a small portion of the power incident from either of the two collinear ports into the orthogonal port which is then coupled into the cavity 12 by the probe 34.

An alternative to using a microwave coupler would be to simply place the diode inside the cavity. This is feasible because of the very small size of the varactor, particularly when used without any separate housing, and with only some dielectric support for it, in order that it will not significantly effect the Q of the cavity except for its voltage variable capacitance. However, any effect other than that due to its variable capacitance will be small and, more significantly, constant.

A sensitive technique for servo tuning of a maser cavity has been disclosed, both as to its concept and a preferred mode of practicing the technique, which is based on detecting the phase relationship between the magnetic and the electric fields in the cavity with an appropriate probe or probes to maintain the resonance condition.

The implementation of this technique in a hydrogen maser requires care to insure effective tuning without disturbance of the maser performance. In particular, the light coupling of the E and H probes requires low noise amplifiers with little sensitivity to temperature variations. The position of the probes in the cavity, and with respect to each other, should also be carefully determined empirically to insure maximum signal with minimum disturbance to the maser power. The exact position will depend largely on the particular configuration and dimensions of the cavity. Preliminary investigations have yielded promising results for this technique in a hydrogen maser.

Although particular embodiments of the invention have been described, it is recognized that modifications and variations may readily occur to those skilled in the art. Consequently, it is intended that the claims be interpreted to cover such modifications and variations.

What is claimed is:

1. A method for servo tuning a finite Q cavity to stabilize its resonance frequency comprising the steps of
    detecting the phase difference between the magnetic and the electric fields in the cavity, and
    in response to the detected phase difference, changing the reactance inside said cavity to correct any drift in resonance frequency.

2. A method as defined in claim 1 wherein the step of changing the reactance inside said cavity to correct resonance frequency is effected by placing a voltage variable reactance element inside said cavity, and changing the reactance of said element in response to said detected deviation.

3. A method as defined in claim 1 wherein the step of changing the reactance inside said cavity to correct resonance frequency is effected by placing a voltage variable reactance element outside of said cavity, and coupling the changed reactance of said element into said cavity with a microwave coupler.

4. A method for servo tuning a finite Q cavity to stabilize its resonance frequency as defined in claim 1 wherein detecting the phase difference between the magnetic and the electric fields in the cavity is accomplished by using two probes, a loop for detecting the magnetic field and a dipole for detecting the electric field to produce separate signals in response to the two fields,
    comparing the phase of the separate signals to detect deviation of their phase from 90°, and in response to the detected phase difference, changing the reactance inside said cavity to correct any drift in resonance frequency.

5. A method as defined in claim 4 wherein the step of changing the reactance inside said cavity to correct resonance frequency is effected by placing a voltage variable reactance element inside said cavity, and changing the reactance of said element in response to said detected deviation.

6. A method as defined in claim 4 wherein the step of changing the reactance inside said cavity to correct resonance frequency is effected by placing a voltage variable reactance element outside of said cavity, and coupling the changed reactance of said element into said cavity with a microwave coupler.

7. Apparatus for servo tuning a finite Q cavity to stabilize its resonance frequency comprising
means for detecting the phase difference between the magnetic and electric fields in said cavity, and
means responsive to said phase detecting means for changing the reactance inside of said cavity to correct any drift in resonance frequency.

8. Apparatus as defined in claim 7 wherein said means for detecting said phase difference is comprised of two probes inside of said cavity, one a loop for detecting the magnetic field and one a loop for detecting the electric field, and means responsive to signals from said probes for detecting the phase difference between the signals and for low-pass filtering the detected difference, thereby producing a dc error signal.

9. Apparatus as defined in claim 8 wherein said means responsive to said phase detecting means for changing the reactance inside of said cavity to correct any drift in resonance frequency is comprised of a voltage variable reactance element outside of said cavity, and means for coupling the reactance of said element into said cavity.

10. Apparatus as defined in claim 8 wherein said two probes are collocated in said cavity.

11. Apparatus as defined in claim 10 wherein said two probes collocated in said cavity are supported in the same plane by a structure of dielectric material having a plane face on which said probes are placed, with the dipole inside the loop.

* * * * *